United States Patent [19]

Shibutani et al.

[11] Patent Number: 5,253,316
[45] Date of Patent: Oct. 12, 1993

[54] OPTICAL CONTACT UNIT AND OPTICAL CONNECTOR USING THE OPTICAL CONTACT UNIT

[75] Inventors: Michitomo Shibutani; Tsuyotake Sawano; Yoshitaro Sato; Masaru Kurisaka, all of Tokyo, Japan

[73] Assignee: NEC Corporation, Tokyo, Japan

[21] Appl. No.: 949,075

[22] Filed: Sep. 22, 1992

[30] Foreign Application Priority Data

Sep. 24, 1991 [JP] Japan .............................. 3-084956[U]

[51] Int. Cl.⁵ .............................................. G02B 6/36
[52] U.S. Cl. ...................................... 385/78; 385/72; 385/137
[58] Field of Search ....................... 385/60, 72, 78, 84, 385/137, 79

[56] References Cited

U.S. PATENT DOCUMENTS

4,634,214 1/1987 Cannon, Jr. et al. ............. 385/84 X
5,142,598 8/1992 Tabone .................................. 385/78
5,146,525 9/1992 Tabone .................................. 385/78

Primary Examiner—John D. Lee
Assistant Examiner—Phan T. Heartney
Attorney, Agent, or Firm—Laff, Whitesel, Conte & Saret

[57] ABSTRACT

In an optical contact unit and an optical connector using the optical contact unit, the optical contact and other components are integrated into a single unit which is collectively mounted and removed to and from the optical contact holding member so that the mounting and the removing operations is facilitated. The optical contact unit comprises an optical fiber with an end portion, a ferrule fitted onto the end portion of the optical fiber, a sleeve containing and supporting the ferrule so that the ferrule is movable in an axial direction thereof, a biasing member contained in the sleeve for biasing the ferrule to make the ferrule project from the sleeve in the axial direction, and a stopper for limiting the movement of the ferrule which is forced by the biasing member to move in the axial direction with respect to the sleeve. The optical connector comprises the optical contact unit of the above-described structure, an optical contact holding member having a receiving hole for receiving the optical contact unit, and a clip fixed in the receiving hole for locking the optical contact unit to the optical contact holding member.

7 Claims, 6 Drawing Sheets

FIG. 1

(PRIOR ART)

FIG. 2

(PRIOR ART)

OPTICAL CONTACT UNIT AND OPTICAL CONNECTOR USING THE OPTICAL CONTACT UNIT

BACKGROUND OF THE INVENTION:

This invention relates to an optical contact unit and an optical connector.

Figure 1:
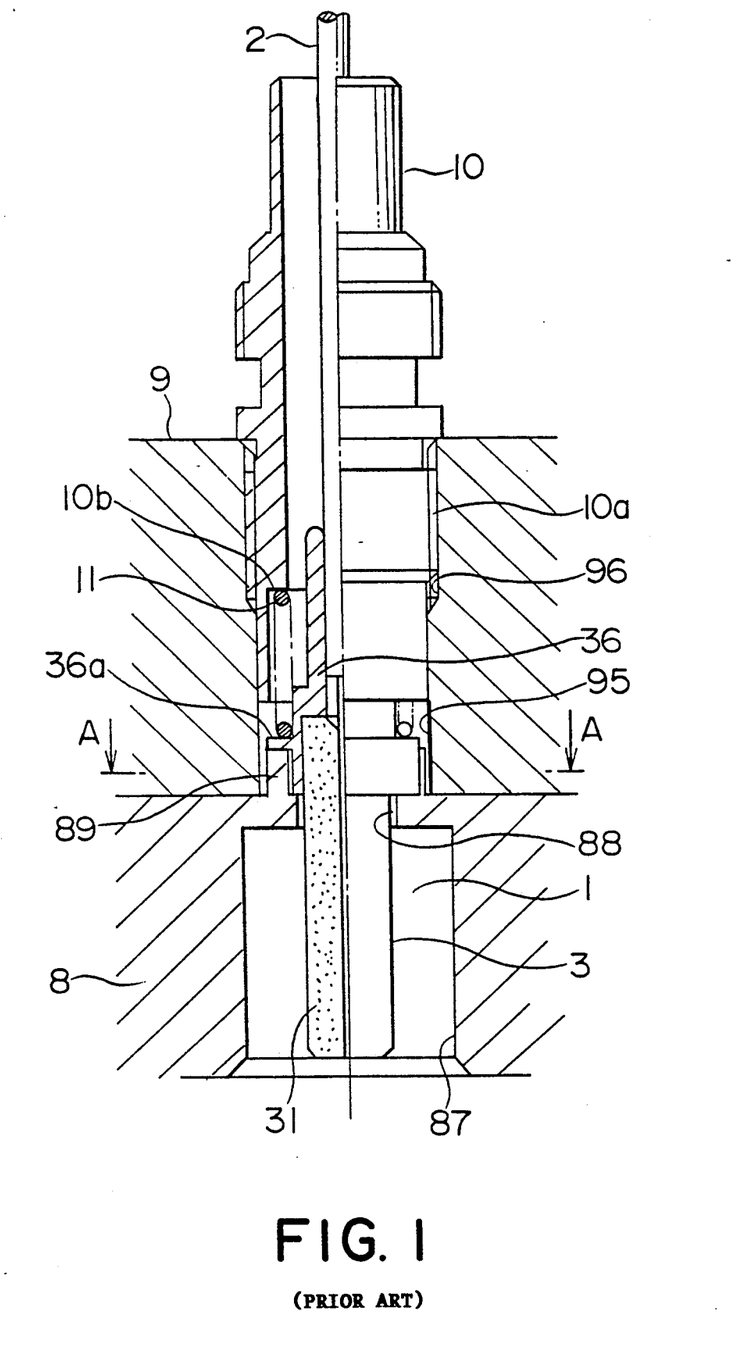
FIG. 1 is a partial sectional view of a conventional optical contact when fitted into optical contact holding members.
Figure 2:
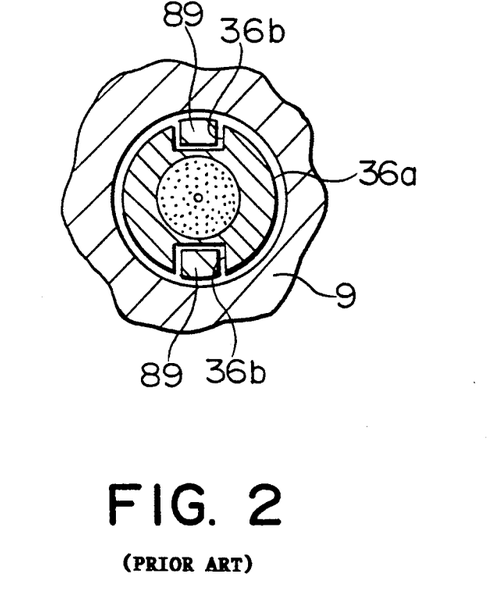
FIG. 2 is a sectional view of the optical contact taken along a line A—A in FIG. 1.

Referring to FIGS. 1 and 2, a conventional optical contact 1 comprises an optical fiber 2 and a ferrule 3 fitted onto an end portion of the optical fiber 2. The ferrule 3 generally comprises a ceramic cylinder 31 and a metal cylinder 36. The ferrule 3 is connected through the metal cylinder 36 to the end portion of the optical fiber 2.

Generally, an optical connector comprises a first optical contact holding member 8, a second optical contact holding member 9, and the optical contact 1 fitted into the first and the second optical contact holding members 8 and 9. The first optical contact holding member 8 has receiving holes 87 and 88 for receiving a top or forward end of the ferrule 3, which end is to be faced to a mating optical contact (not shown). Likewise, the second optical contact holding member 9 has a receiving hole 95 for receiving a rear end of the ferrule 3 and an optical contact fixing tube 10. The first and the second optical contact holding members 8 and 9 are fixedly coupled to each other by the use of any suitable coupling means. Alternatively, the first and the second contact holding members 8 and 9 may be formed in an integral shape.

The metal cylinder 36 of the optical contact 1 has a flange 36a. The flange 36a is provided with rotation preventing grooves 36b. The rotation preventing grooves 36b are engaged with rotation preventing protrusions 89 formed on the first optical contact holding member 8. By the engagement between the rotation preventing grooves 36b and the rotation preventing protrusions 89, the optical contact 1 is prevented from rotating about an optical axis thereof.

The optical contact 1 is fixed to the first and the second optical contact holding members 8 and 9 through the optical contact fixing tube 10 and a coil spring 11. The optical contact fixing tube 10 has an outer peripheral surface provided with an external thread 10a. At one end portion of the optical contact fixing tube 10, a stepped portion 10b is formed on an inner peripheral surface thereof. The coil spring 11 is fitted on the metal cylinder 36 of the optical contact 1. The coil spring 11 has one end brought into contact with the flange 36a of the metal cylinder 36 and the opposite end brought into contact with the stepped portion 10b of the optical contact fixing tube 10.

The external thread 10a of the optical contact fixing tube 10 is screwed into an internal thread 96 formed in the receiving hole 95 of the second optical contact holding member 9. Thus, the optical contact fixing tube 10 is fixed to the second optical contact holding member 9. Simultaneously, the coil spring 11 is put into a compressed state between the flange 36a and the stepped portion 10b. In this event, the coil spring 11 applies a pressure on the flange 36a. Due to the pressure, the metal cylinder 36 of the optical contact 1 is pressed against the first optical contact holding member 8. As a result, the optical contact 1 is fixedly arranged with respect to the first and the second optical contact holding members 8 and 9. Thus, the optical contact 1, the optical contact fixing tube 10, and the coil spring 11 are assembled together when the optical contact fixing tube 10 is threaded into the internal thread 96 and fixed to the second optical contact holding member 9 in the state that the optical contact 1 is fitted into the first and the second optical contact holding members 8 and 9.

As described above, the conventional optical contact is fixed to the first and the second optical contact holding members by the use of other separate components such as the optical contact fixing tube and the coil spring. In this connection, it is troublesome to fit the optical contact into the optical contact holding members. Because of the same reason, it is also troublesome to remove the optical contact from the optical contact holding members for examination and maintenance of the optical contact.

When a number of the optical contacts are arranged in the optical contact holding members, a relatively large pitch is required. This is because the conventional optical contacts are fixed to the optical contact holding members by the use of the separate components such as the optical contact fixing tube and the coil spring as described above. As a result, the optical contacts can not be arranged in the optical contact holding members at a high density.

SUMMARY OF THE INVENTION:

It is therefore an object of this invention to provide an optical contact unit which can facilitate mounting and removing operations of an optical contact to and from an optical contact holding member by integrating the optical contact and other components into a single unit to be mounted and removed to and from the optical contact holding member.

It is another object of this invention to provide an optical contact unit which can be arranged in an optical contact holding member at a high density.

It is a still further object of this invention to provide an optical connector using an optical contact unit of the above-mentioned type.

According to this invention, there is provided an optical contact unit comprising an optical fiber element with an end portion, a ferrule fitted onto the end portion of the optical fiber element, a sleeve containing and supporting the ferrule so that the ferrule is movable in an axial direction thereof, a biasing member contained in the sleeve for biasing the ferrule to make the ferrule project from the sleeve in the axial direction, and a stopper arrangement for limiting the movement of the ferrule which is forced by the biasing member to move in the axial direction with respect to the sleeve.

According to this invention, there is also provided an optical connector comprising an optical contact unit, an optical contact holding member having a receiving hole for receiving the optical contact unit, and a clip member fixed in the receiving hole for locking the optical contact unit to the optical contact holding member. The optical contact unit comprises an optical fiber element with an end portion, a ferrule fitted onto the end portion of the optical fiber element, a sleeve containing and supporting the ferrule so that the ferrule is movable in an axial direction thereof, a biasing member for biasing the ferrule to make the ferrule project from the sleeve in the axial direction, and a stopper arrangement for limiting the movement of the ferrule which is forced by the biasing member to move in the axial direction with respect to the sleeve.

Figure 3:
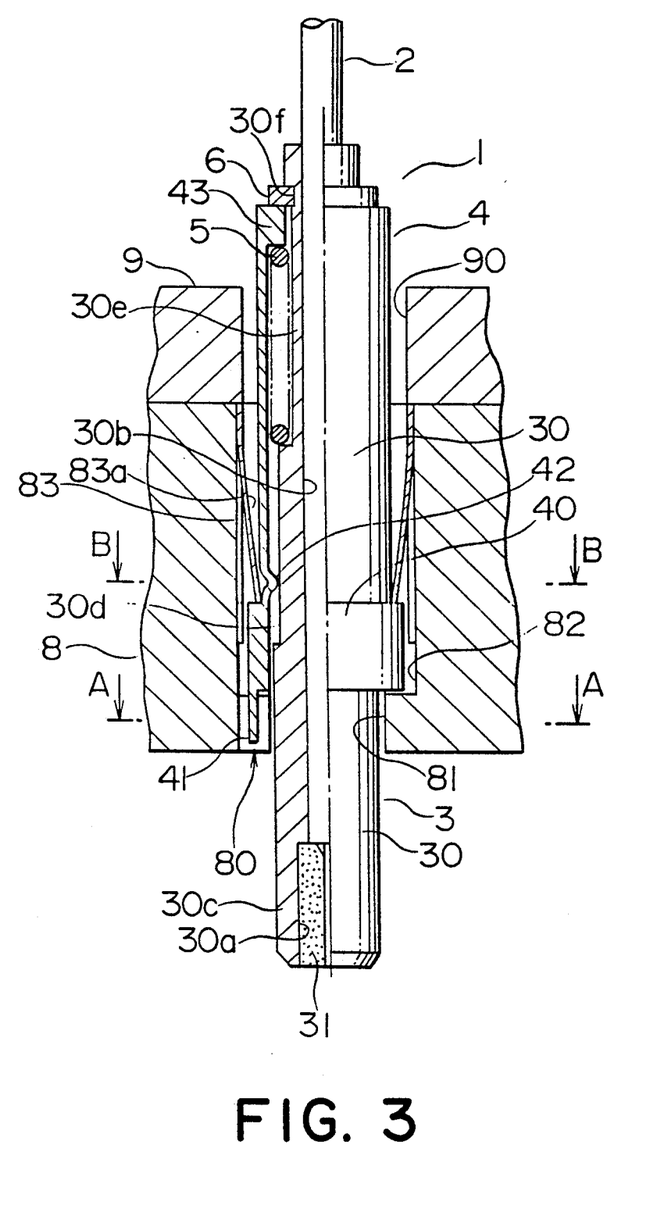
FIG. 3 is a partial sectional view of an optical contact unit according to an embodiment of this invention when fitted into optical contact holding members.
Figure 4A:
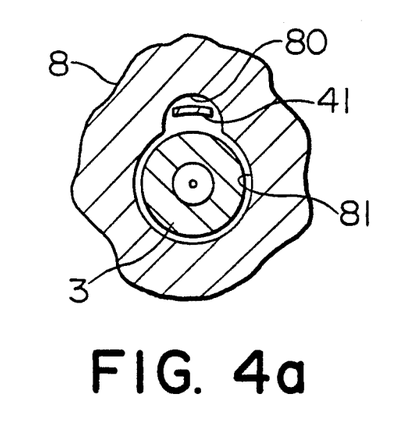
FIG. 4(a) is a transversal sectional view of the optical contact unit taken along a line A—A in FIG. 3.
Figure 4B:
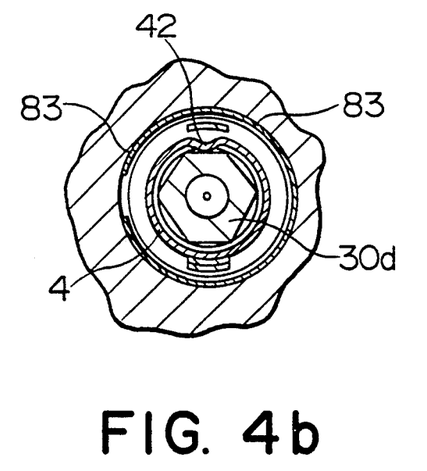
FIG. 4(b) is a transversal sectional view of the optical contact unit taken along a line B—B in FIG. 3.
Figure 5:
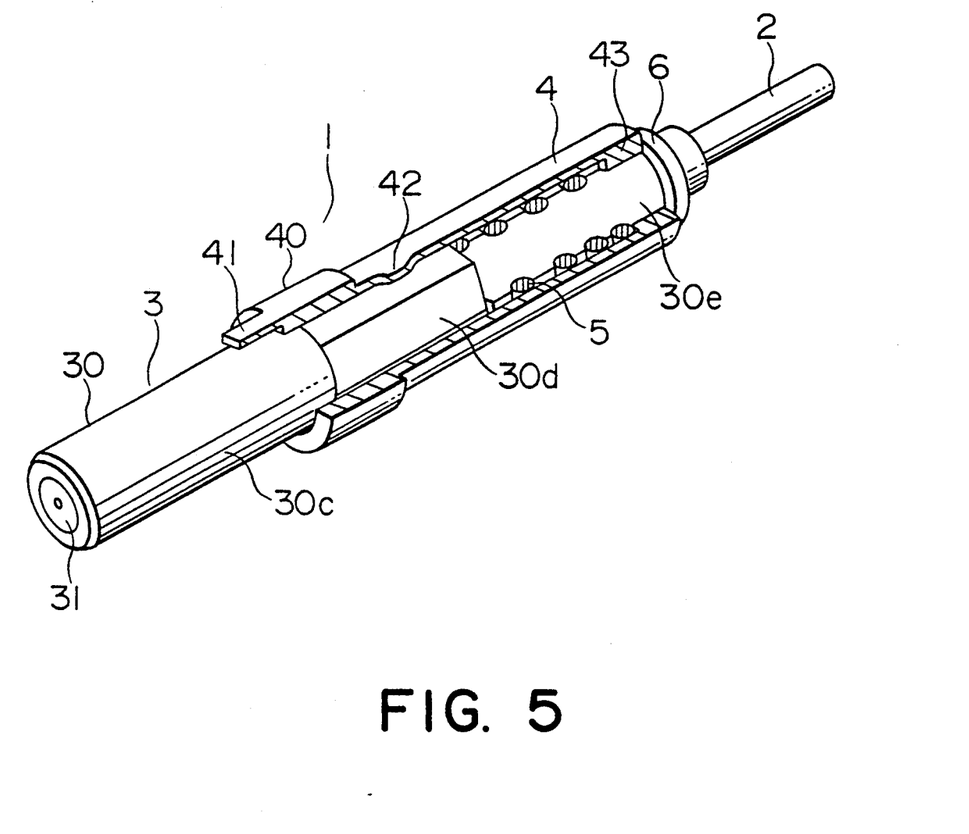
FIG. 5 is a perspective view of the optical contact unit illustrated in FIG. 3.

DESCRIPTION OF THE PREFERRED EMBODIMENT:

Referring to FIGS. 3 through 5, an optical contact unit 1 according to this invention comprises an optical fiber 2, a ferrule 3, a sleeve 4, a biasing member 5, and a stopper 6. The ferrule 3 is fitted onto an end portion of the optical fiber 2. The ferrule 3 has a substantially cylindrical shape. A greater portion of the ferrule 3 is inserted into the sleeve 4. The sleeve 4 has a substantially cylindrical shape and receives the ferrule 3 so that the ferrule 3 is movable in an axial direction (a direction along a cylindrical axis of the ferrule 3). The biasing member 5 is contained in the sleeve 4 for biasing the ferrule 3 to make the ferrule 3 project from the sleeve 4 along the axial direction. In this embodiment, the biasing member 5 comprises a coil spring. The stopper 6 is for limiting the movement of the ferrule 3 with respect to the sleeve 4 in one direction along the cylindrical axis of the ferrule 3. In this embodiment, the stopper 6 comprises a snap ring.

Now, more detailed description will be given as regards the above-mentioned components.

The ferrule 3 comprises a metal cylinder 30 and a ceramic cylinder 31. The metal cylinder 30 has a top or forward end, which is to be faced to a mating optical contact (not shown), provided with an insertion hole 30a coaxial with the cylindrical axis of the ferrule 3. The central hole 30b is formed in the metal cylinder 30 backwardly from the insertion hole 30a. The central hole 30b is coaxial with the insertion hole 30a and has a diameter smaller than that of the insertion hole 30a. The ceramic cylinder 31 is fitted into the insertion hole 30a. The optical fiber 2 is inserted into the central hole 30b formed in the metal cylinder 30. The end portion of the optical fiber 2 is faced to the ceramic cylinder 31.

The metal cylinder 30 comprises a coupling end 30c, a polygonal pole portion 30d, and a spring fitting portion 30e.

The coupling end 30c is to be faced to the mating optical contact (not shown). The coupling end 30c has an outer diameter adapted to optical connection (for example, $\phi=2$mm or $\phi=2.5$mm). The insertion hole 30a is formed in the coupling end 30c.

The polygonal pole portion 30d is adjacent to the coupling end 30c and extends rearwardly from the coupling end 30c. The polygonal pole portion 30d is formed in that portion of the ferrule 3 which is inserted in the sleeve 4. The polygonal pole portion 30d is of a hexagonal pole shape and has an outer diameter smaller than that of the coupling end 30c. One of side surfaces of the polygonal pole portion 30d is put into contact with a rotation preventing protrusion 42 of the sleeve 4, which will later be described. The contact between the one side surface of the polygonal pole portion 30d and the rotation stopper protrusion 42 prevents the ferrule 3 from rotating around the cylindrical axis of the ferrule 3. Thus, in this embodiment, the polygonal pole portion 30d and the rotation preventing protrusion 42 cooperate with each other to form a rotation preventing arrangement for preventing the rotation of the ferrule 3 around the cylindrical axis. Any of the other side surfaces of the polygonal pole portion 30d may be brought into contact with the rotation stopper protrusion 42 instead of the one side surface. By selectively bringing a particular one of the side surfaces of the polygonal pole portion 30e into contact with the rotation preventing protrusion 42, it is possible to compensate for eccentricity of the optical fiber 2 in order to adjust an optical axis.

The spring fitting portion 30e has one end adjacent to a rear end of the polygonal pole portion 30d. The spring fitting portion 30e has, at the other end thereof, a projecting part projecting from the sleeve 4. The remaining part of the spring fitting portion 30e is located in the sleeve 4. The projecting part of the spring fitting portion 30e is provided with a groove 30f. The stopper or snap ring 6 is fitted into the groove 30f. The snap ring 6 is for limiting the movement of the ferrule 3 within the sleeve 4 to prevent the ferrule 3 from being removed from the sleeve 4 along the downward direction in FIG. 3.

The sleeve 4 has a substantially cylindrical shape. An end portion of the sleeve 4, which is to be faced to the mating optical contact (not shown), is formed into a flange 40. A positioning protrusion 41 is formed on a top or forward end of the flange 40 to extend along the axial direction. The positioning protrusion 41 is adapted to be engaged with a groove 80 formed in a first optical contact holding member 8 which will later be described. The sleeve 4 is located at a proper position by the engagement of the positioning protrusion 41 and the groove 80. Thus, in this embodiment, the positioning protrusion 41, which is a locking member for preventing the rotation of the sleeve 4, also serves as a positioning member for the sleeve 4. The rotation preventing protrusion 42 is formed in the vicinity of the forward end of the sleeve 4. The rotation preventing protrusion 42 projects from an inner surface of the sleeve 4 towards a cylindrical axis of the sleeve 4. The rotation preventing protrusion 41 is aligned with the positioning protrusion 41 in the axial direction. An opening 43 formed at a rear end of the sleeve 4 has a reduced size. Specifically, the opening 43 has an inner diameter smaller that the outer diameter of the polygonal pole portion 30d and greater than the outer diameter of the spring fitting portion 30e.

In the sleeve 4, the biasing member or coil spring 5 is arranged on an outer peripheral surface of the spring fitting portion 30e. The coil spring 5 is interposed between an end face of the polygonal pole portion 30d and an end face of the opening 43 formed rearwardly of the sleeve 4 in a compressed state to apply a pressure onto those end faces. The ferrule 3 is biased by the pressure to project from the sleeve 4 along the downward direction in FIG. 3.

An optical contact holding member illustrated in FIGS. 3 and 4 has a structure which will now be described.

The optical contact holding member comprises first and second optical contact holding members 8 and 9. The first optical contact holding member 8 has a first hole 81 for inserting the coupling end 30c of the ferrule 3. The first optical contact holding member 8 also has a second hole 82 for receiving the sleeve 4. The above-mentioned groove 80 is formed in an inner wall defining the first hole 81. The second hole 82 is coaxial with the first hold 81 and has a diameter greater than that of the first hole 81. A clip 83 of a substantially cylindrical shape is fitted in the second hole 82. The clip 83 has a locking piece 83a of a small strip. The locking piece 83a is brought into contact with an end face of the flange 40 of the sleeve 4 to lock the sleeve 4 to the first optical contact holding member 8.

the second optical contact holding member 9 is attached to the first optical contact holding member 8. The second optical contact holding member 9 has a receiving hole 90 for inserting the optical contact unit 1. The receiving hole 90 is coaxial with the second hole 82 and has an inner diameter slightly smaller than that of the second hole 82 to form a stepped portion therebetween. Due to presence of the stepped portion, the clip 83 is prevented from removing out of the second hole 82.

Figure 6:
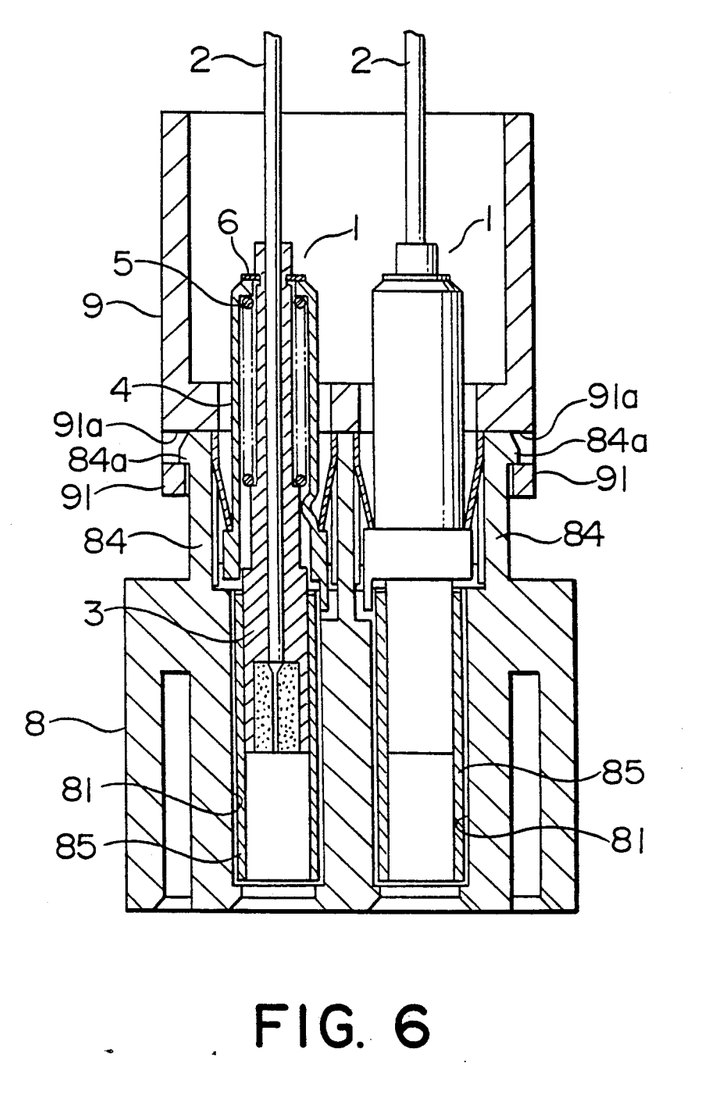
FIG. 6 is a sectional view of a multicore optical connector using the optical contact unit illustrated in FIG. 3.

FIG. 6 shows a multicore optical connector with the optical contact unit illustrated in FIGS. 3 through 5.

Referring to FIG. 6, the multicore optical connector comprises a plurality of optical contact units 1, a first optical contact holding member 8, a second optical contact holding member 9, and a plurality of coupling sleeves 85. For convenience of description, only one optical contact unit 1 will be taken into consideration.

Since the first and the second optical contact holding members 8 and 9 are substantially similar in structure to those illustrated in FIGS. 3 and 4, description will only be directed to different parts.

The first optical contact holding member 8 has a first fitting portion 84. The first fitting portion 84 is provided with a hook portion 84a at one end thereof. A first hole 81 of the first optical contact holding member 8 is longer than that illustrated in FIG. 3. The coupling sleeve 85 is fitted in the first hole 81.

The second optical contact holding member 9 has a second fitting portion 91 at one end faced to the optical contact holding member 8. The second fitting portion 91 is fitted with the first fitting portion 84. The second fitting portion 91 is provided with a coupling hole 91a. The coupling hole 91a is coupled with the hook portion 84a formed on the first fitting portion 84 of the first optical contact holding member 8 to hold the hook portion 84a. Thus, the second optical contact holding member 9 is fixed to the first optical contact holding member 8. In the figure, two optical contacts 1 are held by the first and the second optical contact holding members 8 and 9 to form the multicore optical connector.

What is claimed is:

1. An optical connector comprising an optical contact unit, an optical contact holding member having a receiving hole for receiving said optical contact unit, and clip means fixed in said receiving hole for locking said optical contact unit to said optical contact holding member, said optical contact unit comprising an optical fiber element with an end portion, a ferrule fitted onto said end portion of said optical fiber element, a sleeve containing and supporting said ferrule so that said ferrule is movable in an axial direction thereof, biasing means contained in said sleeve for biasing said ferrule to make said ferrule project from said sleeve in said axial direction, and stopper means for limiting the movement of said ferrule which is forced by said biasing means to move in said axial direction with respect to said sleeve.

2. An optical contact unit comprising:
an optical fiber element with an end portion, a ferrule fitted onto said end portion of said optical fiber element,
a sleeve containing and supporting said ferrule so that said ferrule is movable in an axial direction thereof, biasing means contained in said sleeve for biasing said ferrule to make said ferrule project from said sleeve in said axial direction, and stopping means for limiting the movement of said ferrule which is forced by said biasing means to move in the axial direction with respect to said sleeve,
said optical contact unit being adapted to be fitted to an optical contact holding member with said sleeve being received in a receiving hole formed in said optical contact holding member,
said sleeve having positioning means for determining a limit position for insertion of said optical contact holding member.

3. An optical contact unit as claimed in clam 2, wherein said positioning means also serves as locking means for preventing rotation of said sleeve within said receiving hole formed in said optical contact holding member.

4. An optical contact unit as claimed in claim 3, wherein said positioning means is a protrusion formed on a forward end of said sleeve for being fitted into a groove formed in an inner wall of said receiving hole in said optical contact holding member.

5. An optical contact unit comprising:
an optical fiber element with an end portion, a ferrule fitted onto said end portion of said optical fiber element,
a sleeve containing and supporting said ferrule so that said ferrule is movable in an axial direction thereof, biasing means contained in said sleeve for biasing said ferrule to make said ferrule project from said sleeve in said axial direction, and
stopping means for limiting the movement of said ferrule when it is forced by said biasing means to move in the axial direction with respect to said sleeve,
said ferrule and said sleeve having rotating preventing means for preventing said ferrule from rotating around a cylindrical axis of said ferrule and with respect to said sleeve, wherein said rotation preventing means comprises a polygonal pole portion formed in a part of said ferrule disposed in said sleeve, and a protrusion formed on a part of said sleeve facing said polygonal pole portion to be brought into frictional contact with said polygonal pole portion.

6. An optical contact unit as claimed in claim 5, wherein said polygonal pole portion of said ferrule has an outer diameter smaller than that of an end portion of said ferrule projecting from said sleeve.

7. An optical contact unit as claimed in claim 6, wherein said biasing means is a coil spring, said ferrule comprising a spring fitting portion having an outer diameter smaller than that of said polygonal pole portion, said spring fitting portion being formed adjacent to said polygonal pole portion for loosely fitting said coil spring thereon.

* * * * *

UNITED STATES PATENT AND TRADEMARK OFFICE
CERTIFICATE OF CORRECTION

PATENT NO. : 5,253,316

DATED : October 12, 1993

INVENTOR(S) : Michitomo Shibutani, Tsuyotake Sawano, Yoshitaro Sato, and Masaru Kurisaka It is certified that error appears in the above-identified patent and that said Letters Patent is hereby corrected as shown below:

On title page, item [73] should read as follows:
--Assignees: Japan Aviation Electronics Industry, Limited and NEC Corporation.--

Signed and Sealed this

Twenty-fourth Day of May, 1994

Attest:

BRUCE LEHMAN

*Attesting Officer*   *Commissioner of Patents and Trademarks*